*(12)* United States Patent
Johnson (10) Patent No.: US 8,941,364 B2
(45) Date of Patent: Jan. 27, 2015

(54) ON-DEMAND ELECTRIC POWER SYSTEM

(71) Applicant: Alan K. Johnson, Glyndon, MN (US)

(72) Inventor: Alan K. Johnson, Glyndon, MN (US)

( * ) Notice: Subject to any disclaimer, the term of this patent is extended or adjusted under 35 U.S.C. 154(b) by 151 days.

(21) Appl. No.: 13/847,629

(22) Filed: Mar. 20, 2013

(65) Prior Publication Data

US 2014/0285160 A1    Sep. 25, 2014

(51) Int. Cl.
*H02H 7/06* (2006.01)
*H02P 9/00* (2006.01)
*H02P 9/02* (2006.01)

(52) U.S. Cl.
CPC ....................................... *H02P 9/02* (2013.01)
USPC ............................................. 322/17; 701/22

(58) Field of Classification Search
CPC .. B60W 10/08; B60W 10/06; Y02T 10/6286; Y02T 10/642; F02B 63/04; F02B 63/048; F02D 29/06; F02D 45/00; F02N 11/04; G01F 23/265; G01R 31/3606; G01R 31/3682
USPC ............................................. 322/17; 701/22
See application file for complete search history.

(56) References Cited

U.S. PATENT DOCUMENTS

| 3,142,639 | A |   | 7/1964  | Baer ............................ 210/765 |
| 3,726,606 | A |   | 4/1973  | Peters .............................. 417/7 |
| 4,129,893 | A | * | 12/1978 | Angello .......................... 361/21 |
| 4,137,527 | A |   | 1/1979  | Tennenhouse ................ 340/620 |
| 4,545,335 | A | * | 10/1985 | Hayashi ..................... 123/41.27 |
| 4,857,755 | A | * | 8/1989  | Comstock ...................... 307/47 |
| 5,562,423 | A |   | 10/1996 | Orth ................................ 417/40 |
| 5,731,687 | A | * | 3/1998  | Hirano et al. ..................... 322/1 |
| 5,775,877 | A |   | 7/1998  | Genz ............................... 417/41 |
| 6,149,390 | A |   | 11/2000 | Fisher ............................. 417/40 |
| 6,498,462 | B2 | * | 12/2002 | Ballantine et al. ................ 322/8 |
| 6,630,816 | B2 | * | 10/2003 | Kotani et al. ................... 322/37 |
| 6,682,309 | B2 |   | 1/2004  | Reid ............................... 417/36 |
| 6,766,620 | B2 |   | 7/2004  | Robbins ....................... 52/169.5 |
| 6,894,403 | B2 | * | 5/2005  | Shinogi ....................... 290/40 R |
| 7,395,810 | B2 | * | 7/2008  | Miyashita et al. ......... 123/406.13 |
| 8,167,578 | B2 |   | 5/2012  | Lin ................................. 417/36 |
| 8,550,038 | B2 | * | 10/2013 | Marlenee et al. .......... 123/41.01 |
| 8,783,396 | B2 | * | 7/2014  | Bowman ................... 180/65.285 |
| 8,788,177 | B2 | * | 7/2014  | Hashimoto et al. ............. 701/99 |
| 8,806,853 | B2 | * | 8/2014  | Johnson et al. ................. 60/274 |
| 8,820,404 | B2 |   | 9/2014  | Lisk ......................... 166/250.03 |
| 2007/0204833 | A1 | * | 9/2007  | Miyashita et al. ......... 123/406.53 |
| 2008/0217998 | A1 | * | 9/2008  | Parmley .......................... 307/65 |
| 2009/0200808 | A1 | * | 8/2009  | Parmley, Sr. ................... 290/55 |
| 2010/0132351 | A1 | * | 6/2010  | Silvestro ......................... 60/327 |
| 2011/0248511 | A1 | * | 10/2011 | Marlenee et al. ............. 290/1 A |
| 2012/0251333 | A1 |   | 10/2012 | Irwin ............................. 417/40 |
| 2012/0325460 | A1 |   | 12/2012 | Lisk ......................... 166/250.01 |
| 2013/0006548 | A1 | * | 1/2013  | Zanetti et al. .................... 702/55 |

(Continued)

*Primary Examiner* — Pedro J Cuevas
(74) *Attorney, Agent, or Firm* — Neustel Law Offices (57) ABSTRACT

An on-demand electric power system for providing on-demand electric power in remote locations. The on-demand electric power system generally includes a protective housing, an engine-generator within the protective housing, a control switch electrically positioned between the engine-generator and an electric load, and a control unit in communication with the engine-generator and the control switch to control operation of the engine-generator along with electrical power to the electric load. The control unit detects when electrical power is required by an electric load and then first starts the engine-generator. After a period of time, the control unit then closes the control switch to provide electrical power to the electric load.

17 Claims, 8 Drawing Sheets

(56) References Cited

U.S. PATENT DOCUMENTS

| | | | |
|---|---|---|---|
| 2013/0158767 A1* | 6/2013 | Araki | 701/22 |
| 2013/0204512 A1* | 8/2013 | Mizuno et al. | 701/112 |
| 2014/0163796 A1* | 6/2014 | Omi et al. | 701/22 |
| 2014/0209312 A1* | 7/2014 | Munisteri | 166/308.1 |
| 2014/0216841 A1* | 8/2014 | Winter et al. | 180/271 |
| 2014/0261253 A1* | 9/2014 | Wold | 123/3 |

* cited by examiner

ON-DEMAND ELECTRIC POWER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an electric generator system and more specifically it relates to an on-demand electric power system for effectively and efficiently providing on-demand electric power in remote locations.

2. Description of the Related Art

Any discussion of the related art throughout the specification should in no way be considered as an admission that such related art is widely known or forms part of common general knowledge in the field.

Electrical power is often times required in remote locations where electrical power lines are not cost-effective to extend to. Examples of remote situations where electrical power is required include irrigation systems, water drainage pump stations, water pumps for providing water to livestock, particulate material augers and the like.

Farmers, ranchers and businesses are often forced to either install electric powered devices in undesirable locations near a convenient power source or pay $10,000 to $25,000 or more to have electrical power lines run to a desirable location. Some installation locations simply do not have a convenient power source that can be connected to regardless of the location for the electric powered devices thereby requiring the installation of an engine-generator to provide electrical power. Utilizing an engine-generator typically requires running the engine-generator constantly to provide electrical power when needed which consumes a significant amount of fuel (e.g. gas, diesel, propane) requiring constant refilling by the operator. Alternatively, an operator may choose to manually run the engine-generator to save fuel which is time consuming and may result in an undesirable situation when not attended to timely since electrical power may not be available when needed.

Because of the inherent problems with the related art, there is a need for a new and improved on-demand electric power system for providing on-demand electric power in remote locations.

BRIEF SUMMARY OF THE INVENTION

The invention generally relates to an electric generator system which includes a protective housing, an engine-generator within the protective housing, a control switch electrically positioned between the engine-generator and an electric load, and a control unit in communication with the engine-generator and the control switch to control operation of the engine-generator along with electrical power to the electric load. The control unit detects when electrical power is required by an electric load and then first starts the engine-generator. After a period of time, the control unit then closes the control switch to provide electrical power to the electric load.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate an on-demand electric power system 10, which comprises a protective housing 20, an engine-generator 30 within the protective housing 20, a control switch 70 electrically positioned between the engine-generator 30 and an electric load 12, and a control unit 50 in communication with the engine-generator 30 and the control switch 70 to control operation of the engine-generator 30 along with electrical power to the electric load 12. The control unit 50 detects when electrical power is required by an electric load 12 and then first starts the engine-generator 30. After a period of time, the control unit 50 then closes the control switch 70 to provide electrical power to the electric load 12.

Figure 1:
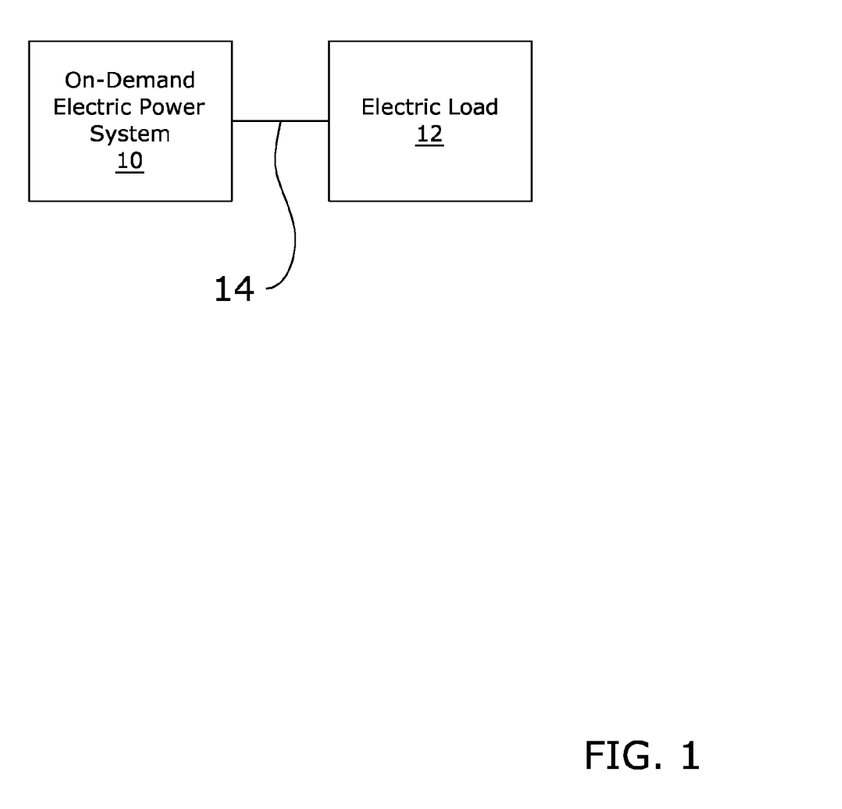
FIG. 1 is a block diagram illustrating the on-demand electric power system in electrical communication with an electric load.

The present invention may be utilized to provide electrical power to various types of electric loads 12 in remote locations. For example, the electric load 12 may be comprised of a pump, an electric motor, particulate material auger, a fan, HVAC system, lights, irrigation pump, drain tile pump station and the like. As can be appreciated, there are no limits as to the types electric load 12 the present invention can be utilized with in remote locations. The electric load 12 may draw a constant or varying power.

B. Protective Housing

Figure 2:
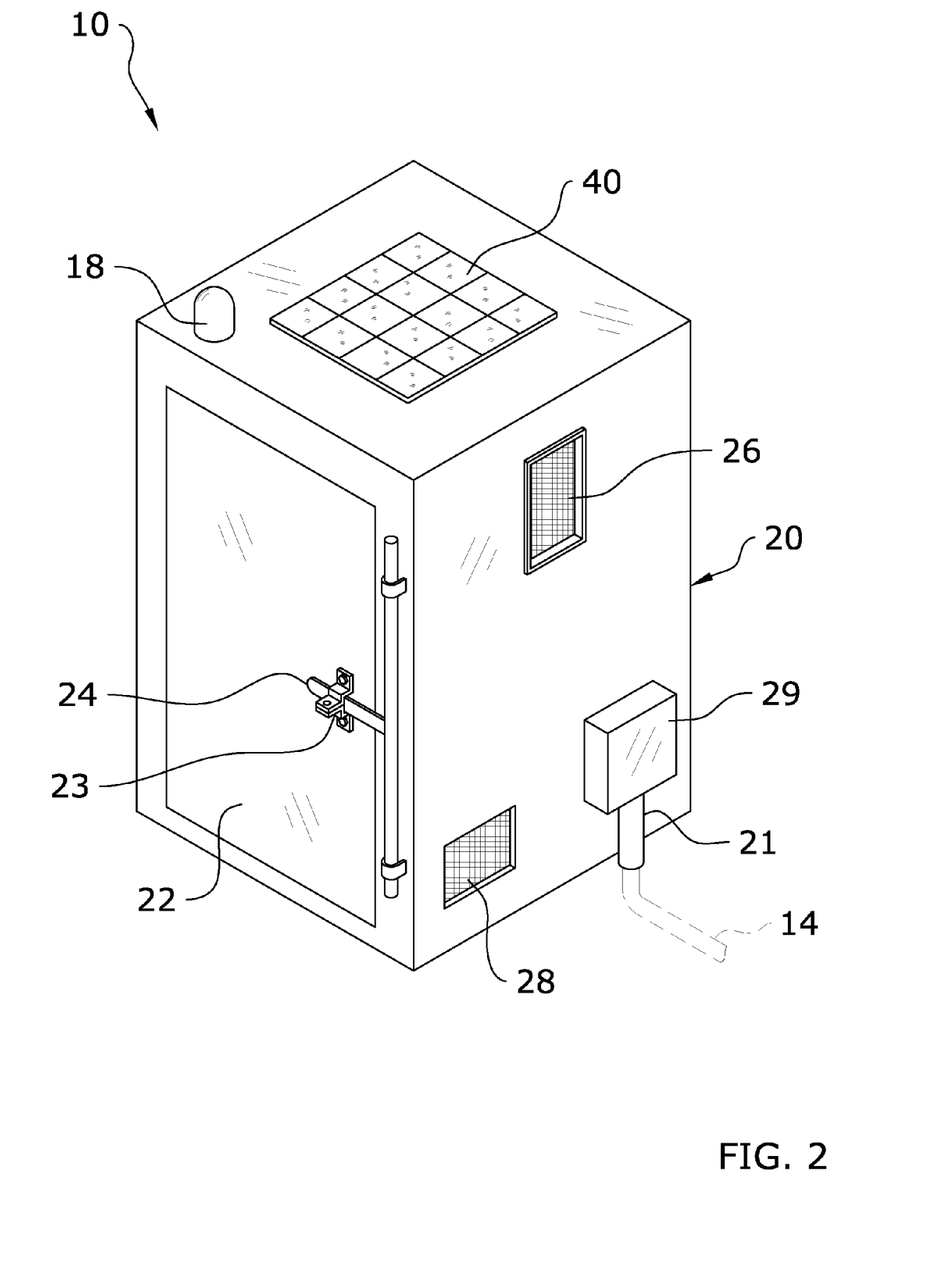
FIG. 2 is an upper perspective view of a protective housing.
Figure 3:
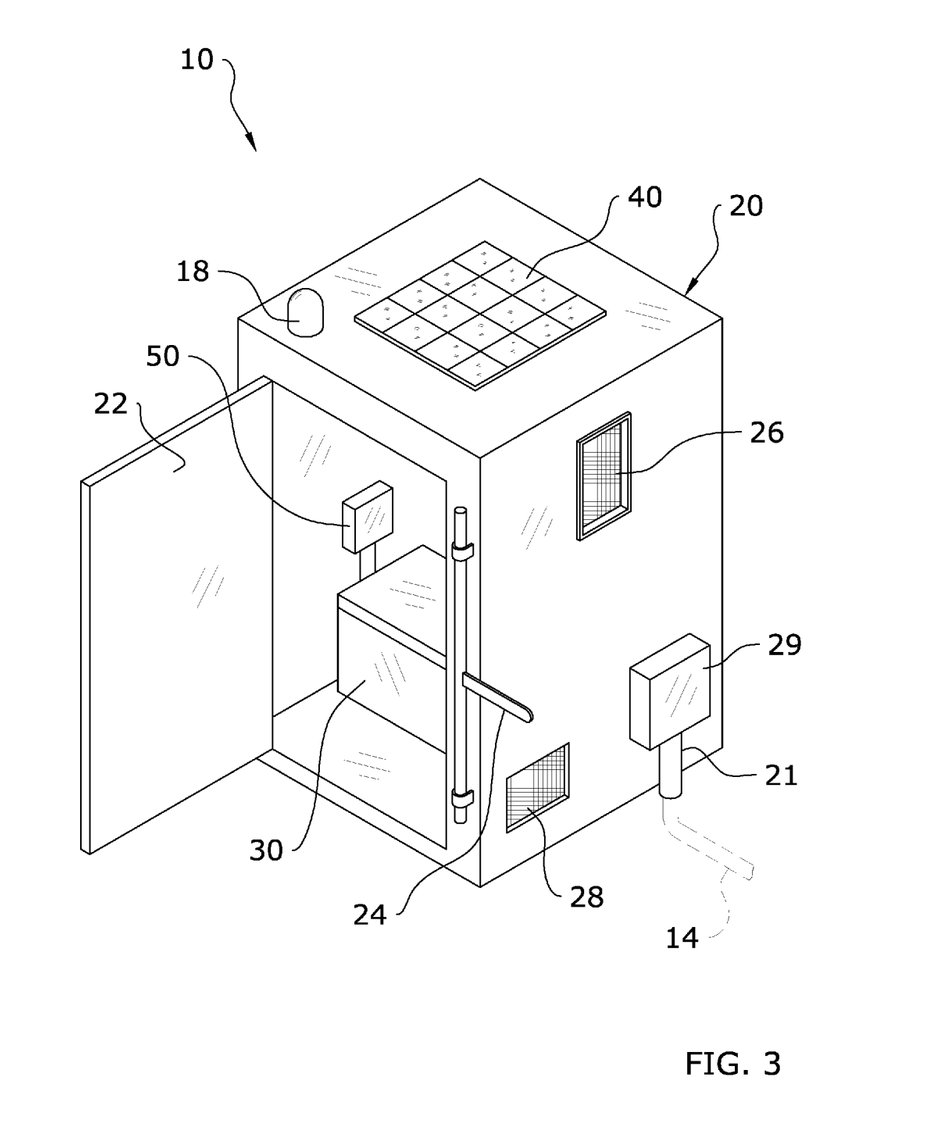
FIG. 3 is an upper perspective view of the protective housing with the door opened.
Figure 4:
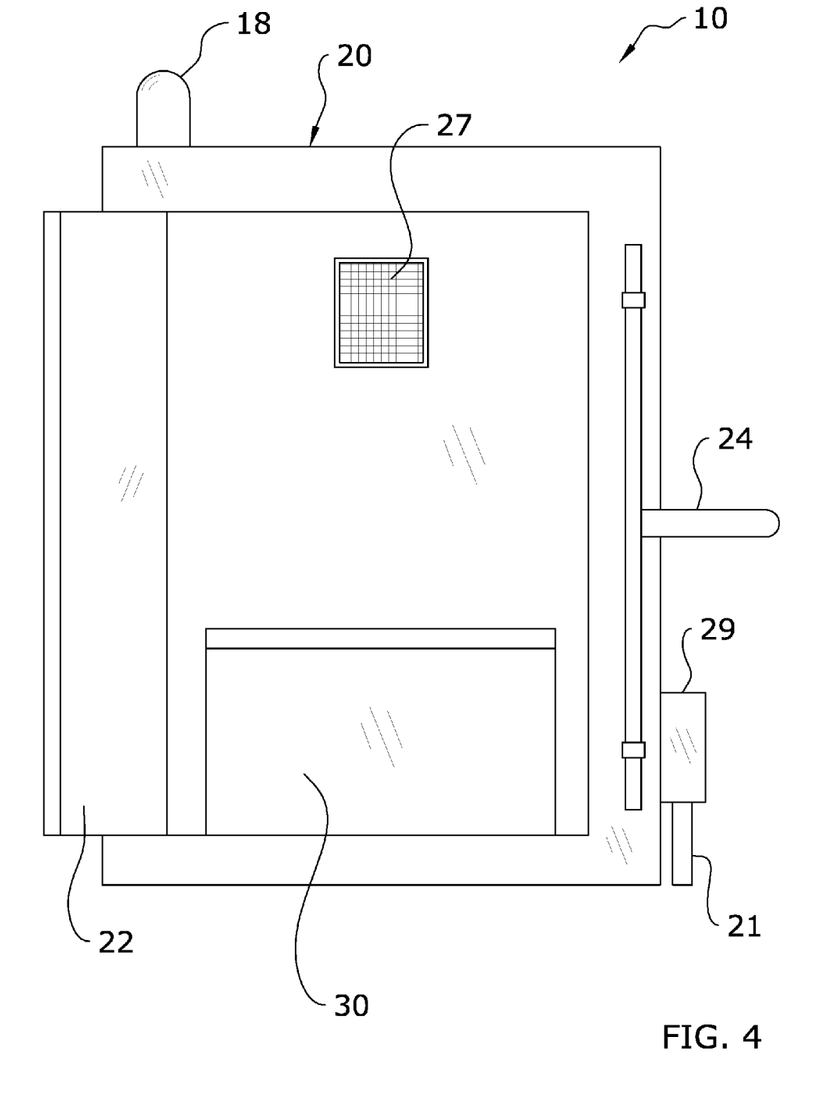
FIG. 4 is a front view of the protective housing with the door open.

FIGS. 2 through 4 illustrate a protective housing 20 for receiving and protecting the engine-generator 30, control unit 50 and related components of the present invention. The protective housing 20 includes a floor, one or more walls, a roof and at least one door 22. The protective housing 20 may be constructed of various types of materials including but not limited to metal (if constructed of metal, the protective housing 20 needs to be grounded).

The protective housing 20 may be comprised of various shaped structures sufficient in size to receive the engine-generator 30. The protective housing 20 preferably has an interior of 7'×7'×7' or greater to provide sufficient room for the engine-generator 30 and also for a worker to enter to work on the engine-generator 30. The protective housing 20 may be supported on a ground surface or a concrete foundation. The protective housing 20 may also be comprised of a movable structure that may be transported to various locations on a trailer or similar transportation device.

As illustrated in FIGS. 2 through 4 of the drawings, the door 22 of the protective housing 20 is pivotally attached and includes a locking structure to secure the door 22 in a locked position or released unlocked position. In particular, a locking handle 24 is pivotally attached to the protective housing 20 and is extendable over a portion of the door 22 where the locking handle 24 is received by a latch 23. The latch 23 is preferably comprised of a lower portion extending upwardly and an upper portion pivotally attached above the lower portion that are positionable over the handle when in the locked position, wherein the portions of the latch 23 each include a corresponding opening that receives a conventional lock to prevent unauthorized access to the interior of the protective housing 20. When the latch 23 is released, the handle is able to be pivoted away from the door 22 and the door 22 opened as illustrated in FIG. 3 of the drawings.

The protective housing 20 includes at least one vent that fluidly connects an interior of the protective housing 20 with an atmosphere outside of the protective housing 20. As illustrated in FIGS. 2 through 4 of the drawings, the protective housing 20 includes a first intake vent 26 and a second intake vent 27 within upper portions of the protective housing 20 to allow cooler air to enter the interior of the protective housing 20. As further illustrated in FIGS. 2 through 4 of the drawings, the protective housing 20 includes at least one exhaust vent 28 that is fluidly connected to the exhaust of the engine-generator 30 to release the exhaust from the engine-generator 30 externally of the protective housing 20. A junction box 29 is preferably attached to the outside of the protective housing 20 and is electrically connected between the electric load 12 and the engine-generator 30. Conventional electrical receptacles may be included within the junction box 29 allowing the user to electrically connect additional electrical devices to the power source. A power cable 14 extends from the junction box 29 through a protective conduit 21 and may be buried in the ground and then electrically connected to the electric load 12.

C. Engine-Generator

The engine-generator 30 is positioned within the protective housing 20 as illustrated in FIGS. 3 and 4 of the drawings. The engine-generator 30 may be comprised of any electrical generator system that utilizes a fuel (e.g. gas, diesel, propane) to run an engine connected to an electrical generator. Various types and sizes of engine-generators 30 may be utilized capable of providing the required electrical power for the electric load 12. The engine-generator 30 will have a fuel tank to provide fuel for the engine and will have a conventional control panel including a manual switch to manually activate the engine-generator 30.

D. Control Switch

Figure 5:
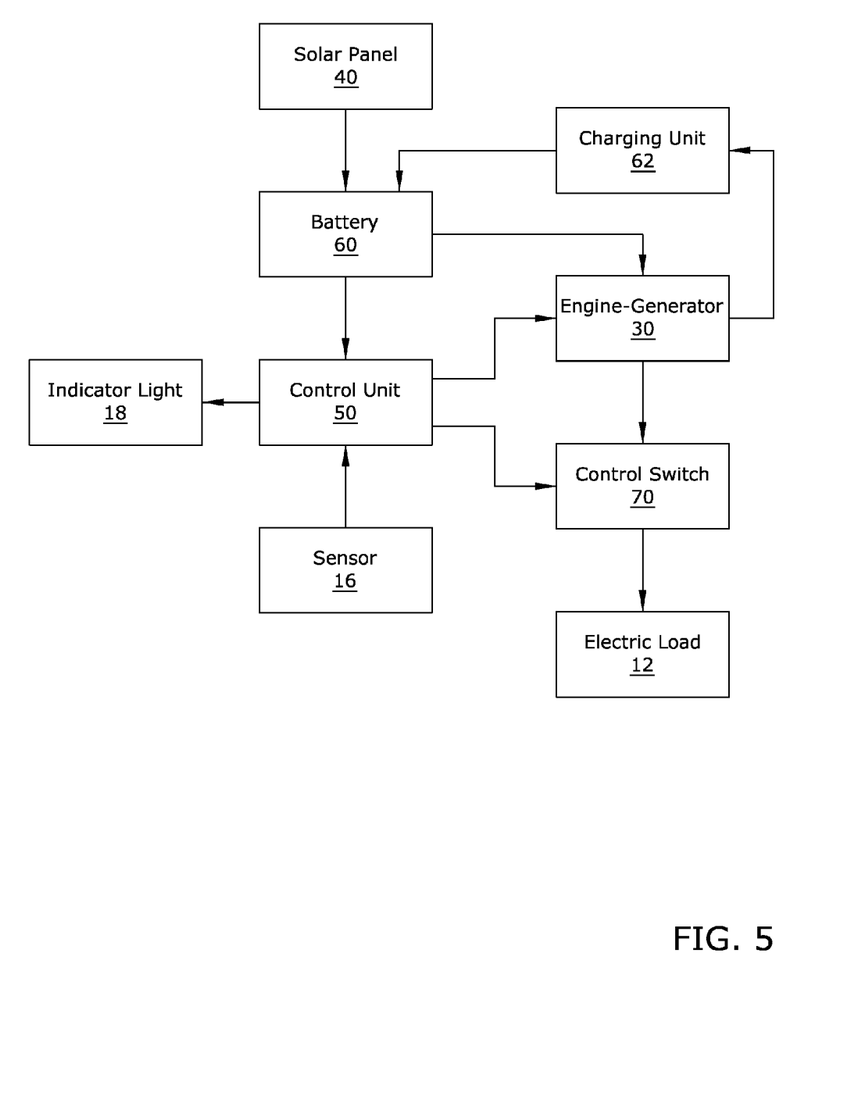
FIG. 5 is a block diagram illustrating the present invention.

The control switch 70 is electrically connected to the engine-generator 30 to control electrical power from the engine-generator 30 to the electric load 12 as illustrated in FIG. 5 of the drawings. In particular, the control switch 70 is electrically connected between the engine-generator 30 and the electric load 12 thereby controlling the flow of electrical power to the electric load 12 from the engine-generator 30. The control switch 70 may be comprised of any switch capable of automatically opening or closing to provide for the selective flow of electrical power through the control switch 70 such as but not limited to a relay or a contactor.

The control switch 70 initially has an open state thereby preventing electrical power from flowing to the electric load 12. When the control switch 70 is in the closed state, electrical power is allowed to flow from the engine-generator 30 to the electric load 12. The control switch 70 may be integral with the engine-generator 30 or external of the engine-generator 30. The control unit 50 communicates with the control switch 70 via wireless or wired communications to open or close the control switch 70 as determined by the control unit 50.

E. Sensor

One or more sensors 16 are utilized for detecting one or more conditions that are in communication with the control unit 50. Various types of sensors 16 may be utilized such as but not limited to fluid level detectors, scales that detect weight, optics sensors and temperature sensors to detect temperature. The sensor 16 may detect a variable (e.g. water level, temperature, etc.) or a state (e.g. switch closed, darkness).

For example, one embodiment of the present invention involves the sensor 16 being comprised of a fluid level detector and wherein the condition detected by the sensor 16 is a fluid level in a tank. In particular, the sensor 16 can be connected to a float positioned within a tank to determine the fluid level within the tank. Various other types of devices capable of measuring the fluid level in a tank may be utilized for the sensor 16. The condition detected by the sensor 16 is then communicated to the control unit 50 and the control unit 50 utilizes the condition information to determine whether the engine-generator 30 should be activated or deactivated.

F. Control Unit

The control unit 50 is in communication with the engine-generator 30, the control switch 70 and the sensor 16 as illustrated in FIG. 5 of the drawings. The control unit 50 is in electrical communication with the engine-generator 30 and the control switch 70 to control the same. The control unit 50 controls the operation of the engine-generator 30 and is adapted to activate or deactivate the engine-generator 30 based on the condition. For example, if the water level in a tank exceeds a maximum level as detected by the sensor 16, the control unit 50 will activate the engine-generator 30. As shown in FIG. 5, the control unit 50 includes an R1 relay, an hour meter, a cycling relay, a time delay 1 relay, an R2 control relay coil and an R3 charging unit relay.

A battery 60 is electrically connected to the control unit 50 to provide electrical power to the control unit 50, the engine-generator 30 and the system when the engine-generator 30 is not operating. The battery 60 may be comprised of any electric power storage device. A solar panel 40 is preferably attached to the roof of the protective housing 20 and electrically connected to the battery 60 to charge the battery 60 during periods of sunlight as illustrated in FIGS. 3 and 5 of the drawings. A charging unit 62 is preferably electrically connected between the battery 60 and the engine-generator 30 to charge the battery 60 when the engine-generator 30 is activated.

Figure 8:
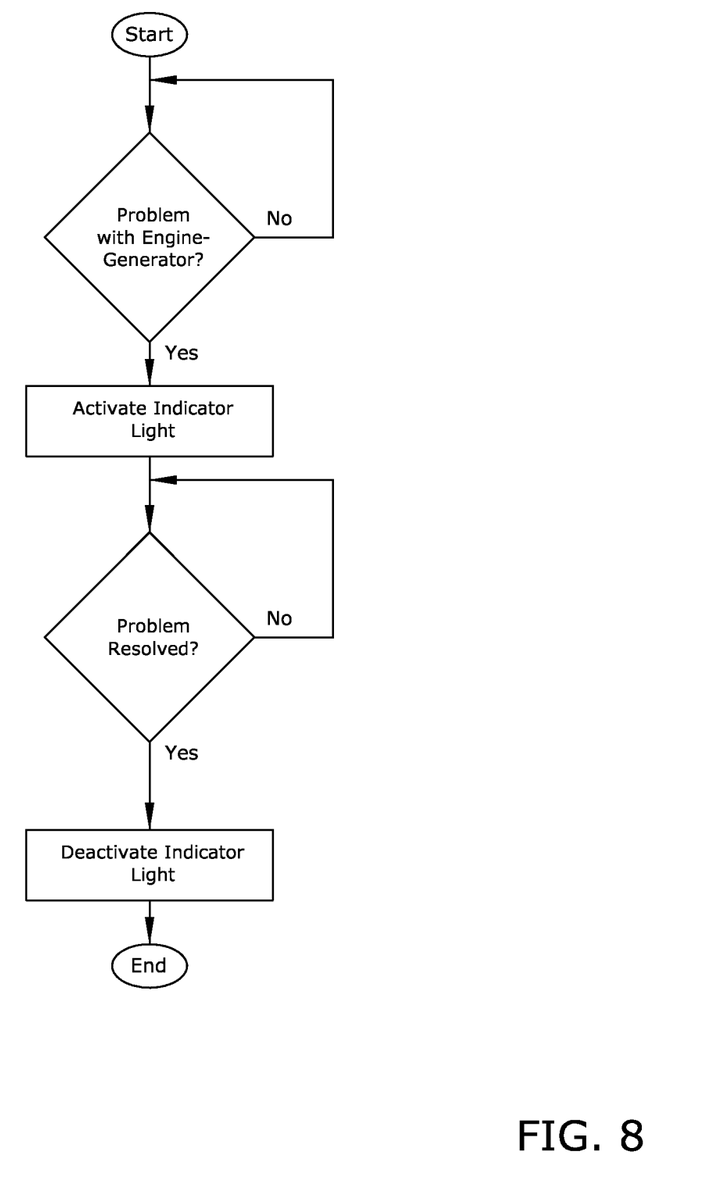
FIG. 8 is a flowchart illustrating the overall operation of indicator light.

An indicator light 18 is electrically connected to the control unit 50 and attached to the roof of the protective housing 20 to provide an external visual indication as to the status of the system. For example, when the engine-generator 30 is operating, the indicator light 18 may illuminate in a green color. As another example, if there is a problem (e.g. engine-generator 30 won't start, engine-generator 30 temperature high, low oil level in the engine-generator 30, excessive condition detected by the sensor 16, etc.), the control unit 50 may illuminate the indicator light 18 in a red color (and possibly flashing). Various other colors for the indicator light 18 may be utilized to visually indicate various other states and conditions.

G. Schematic Diagram

Figure 6:
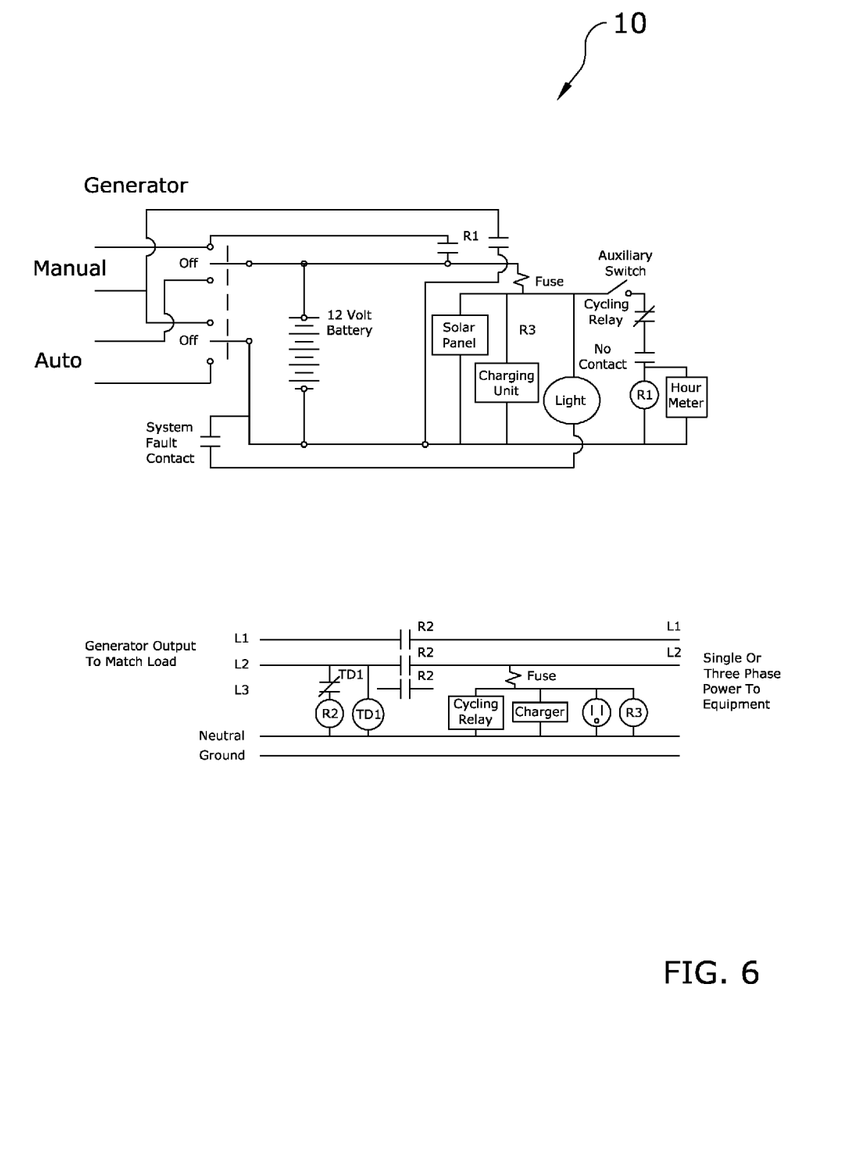
FIG. 6 is a schematic diagram illustrating the present invention.

FIG. 6 illustrates a detailed schematic diagram for the present invention. Besides the factory capabilities of emergency backup, a manual start or off, in the 'OFF' position there may or may not be another switch added to allow the engine-generator 30 to run with any normally open contact such as a single float, a two float system, a pressure switch or a diaphragm, mercury or tip switch. With a normally open float switch you can have the engine-generator 30 start if a vessel gets too full of liquid such as a drain tile pump pit or a tank that gets too full and must be transferred to another area or with a normally closed float you can keep a vessel full of liquid such as a cattle water trough or to pump chemical or other fluid to keep a system working as it should. In the same respect with a pile of grain, granulated type pellets, gravel or rocks, you can put in tip switches to control a takeaway auger or conveyor to control the maximum height of a pile.

The engine-generator 30 is designed to be located in the open outside but for security reasons the engine-generator 30 is preferably installed inside a storage container approximately 7'×7'×7' that is lockable. The storage container has a wood floor but could be bolted down on concrete for more security. Total weight of an 8 KW engine-generator 30 and the building is approximately 1,000 pounds so it can be easily loaded on a trailer and moved to different locations. The heat and exhaust from the engine-generator 30 is direct vented out with a screened louvered exhaust vent 28 and two intake vents (with screens) are installed on the outside walls near the ceiling to provide outside air for cooling. If for some reason the engine-generator 30 doesn't start, runs too fast or has low oil pressure and shuts itself down, a yellow light on the roof will flash that can be seen from a distance at night. The engine-generator 30 will tell what went wrong on a digital readout under the engine-generator 30 hood, push a button to reset it and it will try again. On the side of the building is a steel box where there is a cord that connects to the load to be energized and another cord to plug into the normally open contact. These cord ends are quick connect ends in a weatherproof box that can be locked.

The volt battery 60 inside the engine-generator 30 provides the control power for the auxiliary switch and the 'on demand system'. If the engine-generator 30 rocker or selector switch is in the 'off position, 12 volts DC is fused and fed to the auxiliary switch. When the auxiliary switch is closed power is fed to the normally open contact. If the normally open contact closes it energizes the R1 relay. Relay R1 is normally open, but when the contacts of relay R1 close, the manual start side of the engine-generator 30 is energized. The digital readout tells how many seconds before the engine-generator 30 will try to start. If it doesn't start right away, it stops cranking and gives itself a break and then tries again. When the engine-generator 30 starts it has a time delay to make sure the engine-generator 30 is running acceptably to provide dependable power for the load. When the time delay times out another relay closes and sends power to the load. The engine-generator 30 output power is also supplied to an additional charging unit 62 located under the hood of the housing for the engine-generator 30 to provide extra charging for the battery 60. When the R1 relay is energized, an hour meter is also energized which tells the run time of the engine-generator 30 thereby informing the operator when to fill the fuel tank or change oil. The engine-generator 30 will run until the normally open contact opens and will stop and the digital readout will say engine-generator 30 off. A cycling relay prevents the unit from starting and stopping too often in the auxiliary position. The engine-generator 30 will wait minutes, hours, days or weeks until it is needed again. There is a solar panel 40 to maintain the battery 60 during shutdown. If electric power is needed at any time you can switch it to manual and when it starts, use the GFCI 110 volt receptacle on the side of the generator. The engine-generator 30 should be sized to the electric load 12 that it must handle.

H. Operation of Preferred Embodiment

Figure 7:
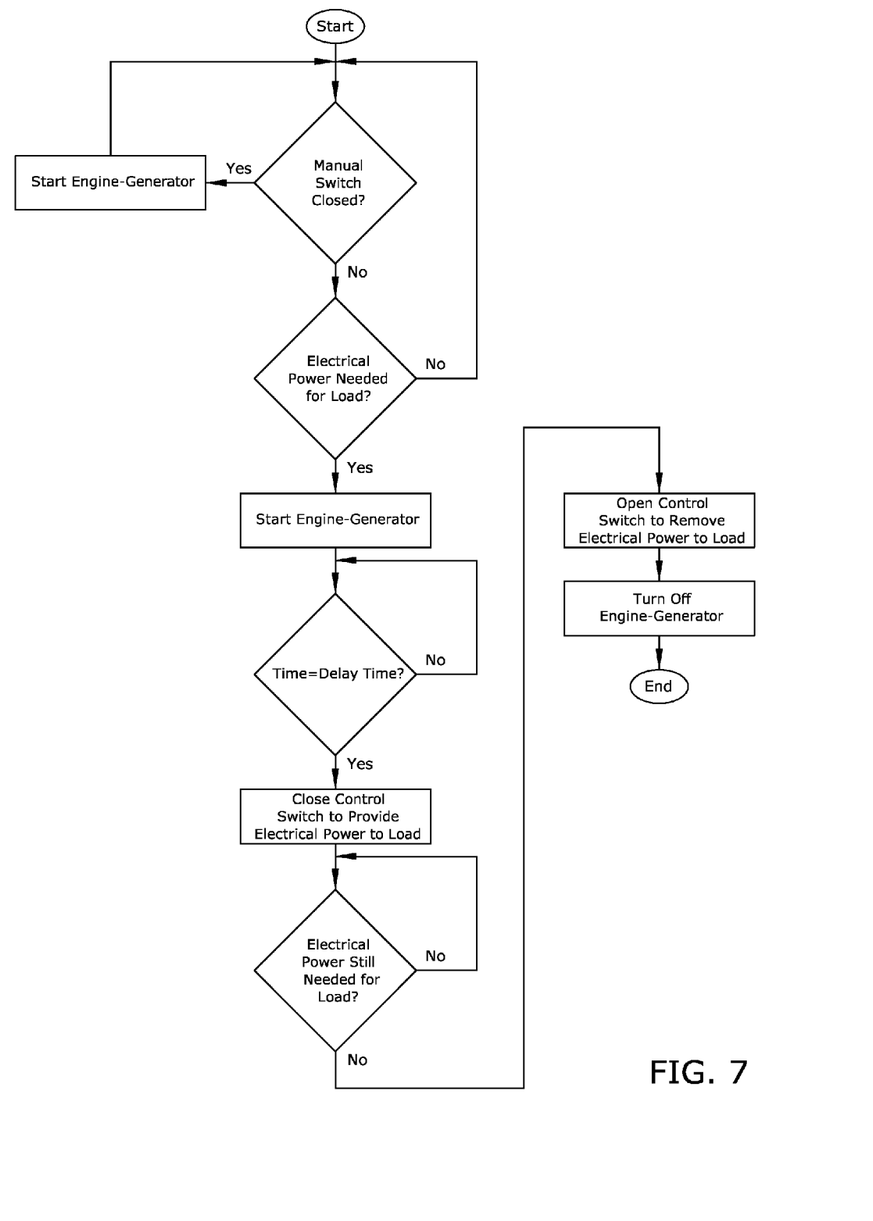
FIG. 7 is a flowchart illustrating the overall functionality of the present invention.

In use, the control switch 70 is initially open and the engine-generator 30 is initially deactivated. During daytime hours, the solar panel 40 maintains the battery 60 at full charge so the battery 60 is capable of starting the engine-generator 30 and providing electrical power for the other electrical components in the system.

Once a start condition is detected by the sensor 16 that requires electrical power to the electric load 12 (e.g. a water level exceeds a maximum level requiring a pump to operate), the control unit 50 first activates the engine-generator 30 while keeping the control switch 70 in the open state. Electrical power from the battery 60 is used to power a starter on the engine-generator 30 that starts the engine portion of the engine-generator 30. Once the engine portion of the engine-generator 30 is started, the generator portion generates electricity without any load from the electric load 12.

It is preferable that the control switch 70 remain open for a period of time (delay time) sufficient to allow the engine-generator 30 to become fully operational and to avoid overloading the engine-generator 30 initially when starting which can damage the engine-generator 30 over time with repeated starts. In addition, it is preferable to have the generator portion producing the desired level of electrical power before electrically connecting the electric load 12 to avoid providing insufficient electrical power (e.g. reduced voltage, reduced current) to the electric load 12 as the engine portion attempts to get to the desired engine speed. It is preferable that the delay time between the activation of the engine-generator 30 and the later closing of the control switch 70 is at least 5 seconds or greater. The inventor has found that providing a delay time of 15 seconds or more is preferable for most engine-generators 30 thereby providing sufficient time for the engine-generator 30 to provide a consistent electrical power source. The delay time may be preset by the manufacture and/or the user may set the delay time (e.g. the user may choose to set the delay time to 30 seconds for various reasons). The control unit 50 may be programmed via a conventional keypad by the user and the control unit 50 may display the programming via a display. The delay time may also vary based upon the condition detected by the sensor 16.

After the delay time has passed, the control unit 50 then closes the control switch 70 to provide electrical power from the engine-generator 30 to the electric load 12. The electric load 12 may be controlled by the control unit 50, however, it is preferable that the electric load 12 be left in an "on" state so when electrical power is provided the electric load 12 is automatically activated. The electric load 12 (e.g. a pump) is then activated to operate in the manner designed (e.g. pumping water). The control switch 70 remains closed until a start condition detected by the sensor 16 changes to a state where electrical power to the electric load 12 is no longer needed (e.g. the water level falls below a minimum level or water is no longer detected). After the start condition is detected, the control unit 50 opens the control switch 70 to terminate electrical power to the electric load 12 and deactivates the engine-generator 30 to turn off the engine portion of the engine-generator 30. The control switch 70 may be opened before deactivating the engine-generator 30 to remove the load from the engine-generator 30 prior to stopping the engine-generator 30.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An on-demand electric power system for providing electrical power in remote locations, comprising:
    an engine-generator;
    a control switch electrically connected said engine-generator to control electrical power from said engine-generator to an electric load;
    a sensor for detecting a condition; and
    a control unit in communication with said engine-generator, said control switch and said sensor, wherein said control unit controls the operation of said engine-generator, wherein said control unit is adapted to activate said engine-generator based on said condition, wherein said control unit is adapted to deactivate said engine-generator based on said condition;
    wherein said engine-generator is initially deactivated and wherein said control switch is initially open to prevent electrical power being provided to the electric load;
    wherein when said condition requires electrical power to the electric load, said control unit first activates said engine-generator and then closes said control switch after a delay time;
    wherein said delay time is greater than 5 seconds.

2. The on-demand electric power system of claim 1, wherein said control unit is in electrical communication with said engine-generator and said control switch.

3. The on-demand electric power system of claim 1, wherein said sensor is comprised of a fluid level detector and wherein said condition is comprised of a fluid level.

4. The on-demand electric power system of claim 3, wherein said control unit activates said engine-generator when said fluid level exceeds a maximum level.

5. The on-demand electric power system of claim 4, wherein said control unit deactivates said engine-generator when said fluid level is below a minimum level.

6. The on-demand electric power system of claim 3, wherein said sensor is connected to a float positioned within a tank to determine said fluid level within said tank.

7. The on-demand electric power system of claim 1, wherein said delay time is greater than or equal to 15 seconds.

8. An on-demand electric power system for providing electrical power in remote locations, comprising:
    a protective housing having a door and a vent, wherein said vent fluidly connects an interior of said protective housing with an atmosphere outside of said protective housing;
    an engine-generator positioned within said protective housing, wherein said engine-generator is fluidly connected to said vent;
    a control switch electrically connected said engine-generator to control electrical power from said engine-generator to an electric load;
    a sensor for detecting a condition; and
    a control unit in communication with said engine-generator, said control switch and said sensor, wherein said control unit controls the operation of said engine-generator, wherein said control unit is adapted to activate said engine-generator based on said condition, wherein said control unit is adapted to deactivate said engine-generator based on said condition;
    wherein said engine-generator is initially deactivated and wherein said control switch is initially open to prevent electrical power being provided to the electric load;
    wherein when said condition requires electrical power to the electric load, said control unit first activates said engine-generator and then closes said control switch after a delay time;
    wherein said delay time is greater than 5 seconds.

9. The on-demand electric power system of claim 8, wherein said control unit is in electrical communication with said engine-generator and said control switch.

10. The on-demand electric power system of claim 8, wherein said sensor is comprised of a fluid level detector and wherein said condition is comprised of a fluid level.

11. The on-demand electric power system of claim 10, wherein said control unit activates said engine-generator when said fluid level exceeds a maximum level.

12. The on-demand electric power system of claim 11, wherein said control unit deactivates said engine-generator when said fluid level is below a minimum level.

13. The on-demand electric power system of claim 10, wherein said sensor is connected to a float positioned within a tank to determine said fluid level within said tank.

14. The on-demand electric power system of claim 8, wherein said delay time is greater than or equal to 15 seconds.

15. An on-demand electric power system for providing electrical power in remote locations, comprising:
- a protective housing having a door and a vent, wherein said vent fluidly connects an interior of said protective housing with an atmosphere outside of said protective housing;
- an engine-generator positioned within said protective housing, wherein said engine-generator is fluidly connected to said vent;
- a control switch electrically connected said engine-generator to control electrical power from said engine-generator to an electric load;
- a sensor for detecting a condition;
- wherein said sensor is comprised of a fluid level detector and wherein said condition is comprised of a fluid level; and
- a control unit in communication with said engine-generator, said control switch and said sensor, wherein said control unit controls the operation of said engine-generator, wherein said control unit is adapted to activate said engine-generator based on said condition, wherein said control unit is adapted to deactivate said engine-generator based on said condition;
- wherein said engine-generator is initially deactivated and wherein said control switch is initially open to prevent electrical power being provided to the electric load;
- wherein when said condition requires electrical power to the electric load, said control unit first activates said engine-generator and then closes said control switch after a delay time;
- wherein said delay time is greater than 5 seconds;
- wherein said control unit activates said engine-generator when said fluid level exceeds a maximum level;
- wherein said control unit deactivates said engine-generator when said fluid level is below a minimum level.

16. The on-demand electric power system of claim 15, wherein said sensor is connected to a float positioned within a tank to determine said fluid level within said tank.

17. The on-demand electric power system of claim 15, wherein said delay time is greater than or equal to 15 seconds.

* * * * *